(12) United States Patent
Ormson (10) Patent No.: US 6,973,319 B2
(45) Date of Patent: Dec. 6, 2005

(54) SYSTEM AND METHOD FOR MEASURING TRAFFIC FLOW

(75) Inventor: Richard Ormson, Berkshire (GB)

(73) Assignee: NEC Corporation, Tokyo (JP)

( * ) Notice: Subject to any disclaimer, the term of this patent is extended or adjusted under 35 U.S.C. 154(b) by 590 days.

(21) Appl. No.: 09/996,250

(22) Filed: Nov. 28, 2001

(65) Prior Publication Data

US 2002/0082766 A1   Jun. 27, 2002

(30) Foreign Application Priority Data

Nov. 30, 2000 (GB) ................................. 0029243

(51) Int. Cl.[7] .............................................. H04Q 7/20
(52) U.S. Cl. .......................... 455/456.1; 340/995.13; 701/117
(58) Field of Search ........................ 455/456.1, 456.2, 455/404.2, 456.6; 340/901, 905, 990, 993, 340/995, 988, 917; 707/102, 104.1; 701/117, 701/118, 119, 207, 209, 300

(56) References Cited

U.S. PATENT DOCUMENTS

| 4,361,202 | A | * | 11/1982 | Minovitch ................. 180/168 |
| 5,465,289 | A | | 11/1995 | Kennedy, Jr. |
| 6,185,421 | B1 | * | 2/2001 | Alperovich et al. ........ 455/433 |
| 6,353,792 | B1 | * | 3/2002 | Murthy ....................... 701/117 |
| 6,650,948 | B1 | * | 11/2003 | Atkinson et al. ............. 700/66 |
| 6,683,538 | B1 | * | 1/2004 | Wilkes, Jr. .................. 340/903 |
| 6,690,292 | B1 | * | 2/2004 | Meadows et al. ........... 340/905 |

FOREIGN PATENT DOCUMENTS

WO    WO 98/54682    12/1998

* cited by examiner

Primary Examiner—Jean Gelin
(74) Attorney, Agent, or Firm—Scully Scott Murphy & Presser (57) ABSTRACT

A method and apparatus for determining the vehicular traffic flow includes a position monitor in a telecommunications network which assembles and processes position data from mobile telephones to determine traffic flow. The position of each mobile telephone within the system is determined at intervals and the likely route and speed determined with reference to a stored road atlas. The traffic flow is predominantly determined from data received from mobile telephone handsets which have requested traffic information. These handsets are likely to be travelling in vehicles, thereby giving greater accuracy to the traffic flow measurement. In addition, the mobile telephone handsets requesting traffic information are reconfigured to provide more accurate data, such as by broadcasting update signals at a greater rate than usual.

13 Claims, 7 Drawing Sheets

SYSTEM AND METHOD FOR MEASURING TRAFFIC FLOW

FIELD OF THE INVENTION

The present invention relates to a system and method for measuring traffic flow, and in particular to the use of existing mobile telephones and networks to vehicle traffic flow.

BACKGROUND TO THE INVENTION

The use of mobile telephones has increased rapidly in recent years to the extent that a significant percentage of the populations of developed countries are regular users. This presents opportunities to offer services to users in addition to the usual communication service. Protocols such as WAP allow delivery of graphic and text content to link to the Internet. Services and information can thereby be offered. Amongst services for newer generation handheld portable (HHP) mobile telephones are location based services (LBS). These are services which use information on the location of a mobile telephone and hence the user in some way.

The US Federal Communications Commission has decided that network operators must be able to identify the location of a call to within 400 feet (125 m) of its origin at least two-thirds of the time by 1 Oct. 1, 2001. A regulatory requirement on this short a timescale effectively decrees that the solution be network based (i.e. the location-pinpointing intelligence does not reside in the handset). Insisting that subscribers upgrade their handsets is unlikely to be a popular proposition unless the networks volunteer to pay; they will, of course, only do this if it is cheaper than upgrading their network. While network-based solutions are expensive for the operator to deploy, they are still cheaper than upgrading the entire user base. Given this background, it seems likely that LBS in the US will be promoted, at least initially, with an Emergency 911 message and will be network based.

The focus in non-US markets will probably be somewhat different. While there is a regulatory requirement for LBS in the EU, the timescale is somewhat more relaxed; services must be in place by 2008. In reality we will have LBS in Europe long before then, but as a result of commercial, not regulatory, pressures.

There are many services that could be offered to a customer based on location. Some of these services are intended to be "unique selling points" for next generation mobile communications and their introduction is therefore of considerable commercial importance to the network operators:
  Maps
  Emergency
  Advertising
  Yellow pages
  Local information
  Security/tracking of stolen property
  Fleet vehicle tracking
  Telematics
  Traffic information (as per TrafficMaster)
  Location based charging
  Inshore navigation
  Weather
  Real time public transport information (note: both user and current information move!)
  Friend/employee finder
The accuracy of location required varies from one service to another, and the accuracy required also impacts the way in which the location detection should be implemented.

One system for monitoring vehicular traffic is disclosed in U.S. Pat. No. 5,465,289. This system uses additional radio receivers to detect the rough location of mobile telephones by detecting handoffs between cell boundaries. Handoffs are the signals transmitted between mobile telephones and base transmitters to indicate that the mobile telephone should communicate with a base station of an adjacent cell when moving from one cell to another. The additional radio receivers require functionality to detect cell handoffs, store records of handoffs and to detect and record geolocation data. This system is not applicable to anything other than first generation systems, however, and will not work with a network—it is a stand alone system.

Vehicle count and flow rate data is generated from cell to cell handoffs and geolocation data. Handoffs into and out of cells generally occur at the same position on the roadway. Handoffs can be accumulated per unit time to estimate vehicle count on a roadway. Time between handoffs and knowing the distance travelled allows a determination flow rate to be made. Geolocation of vehicles over time can also yield flow rate. Geolocation also allows handoff data to be localised to a particular roadway. Periodic reports are generated for the roadways under surveillance.

Whilst the system disclosed in '289 provides a useful service, we have appreciated that there are deficiencies. The system is only accurate to the size of cells in the cellular network, which can be anywhere from 100s of meters to 10s of kilometers. In addition, the existing systems are not adapted to provide location based services and so suffer from further deficiencies.

SUMMARY OF THE INVENTION

We have appreciated that traffic monitoring can be achieved with mobile telephone networks, but that modifications are required. We have further appreciated that such modifications should be kept to a minimum for such services to be viable.

Accordingly, there is provided a vehicular traffic monitoring system comprising a mobile telephone network including a plurality of base stations for receiving and transmitting signals from and to mobile telephones, and a position monitoring unit for deriving the position of mobile telephones communicating via the mobile telephone network, the position monitoring unit comprising a store for storing identification and position data for a plurality of mobile telephones and a traffic flow analyser for determining traffic flow at positions of mobile telephones wherein the store and traffic flow analyser are configured such that the traffic flow is predominantly determined only from identification and position data of a subset of mobile telephones, the subset being those mobile telephones that have transmitted a traffic monitor request to the mobile telephone network.

The invention provides the advantage that the data analysed for traffic monitoring is predominantly derived from mobile telephones that are with users that are travelling, and have therefore requested traffic information. This reduces the possibility of errors from data included in the sample from mobile telephones that are not travelling in road vehicles. Various weighting factors could be used to assess traffic flow as a factor of those HHP's known to be in vehicles (requesting traffic information) and others.

The invention also provides the advantage that a specific action can be taken by a user to receive traffic information, by initiating a traffic monitor request, and this can be used to reconfigure the user's mobile telephone as necessary. In particular, the mobile telephones in the subset of mobile telephones are each arranged to broadcast a signal to the network more frequently than mobile telephones not in the subset. The system thereby ensures frequent position updates can be determined from mobile telephones that travelling and have "opted into" the traffic system. As an alternative, this could be achieved by putting a flag on that user's account at the network's user database. This would allow the system to work with unmodified handsets. It also should be noted that the handset driven "opt in" option could be implemented under "SIM toolkit", which again requires no handset modification because most handsets already support The invention also resides in a mobile telephone adapted for use with a vehicular traffic monitoring system associated with a mobile telephone network, comprising: a radio unit, processor and memory for providing telephone communication with a mobile telephone network including periodic update signals and arranged to provide a traffic update signal function, the traffic update signal function comprising an input for receiving a request from a mobile telephone user for traffic information and an output for causing the radio unit to broadcast an update signal more frequently than usual.

The mobile telephone with this feature thus cooperates with the traffic monitoring system to ensure accurate traffic flow data is derived. A user requesting traffic information automatically becomes a sample in the traffic flow statistics.

These and further inventive features are defined in the claims to which reference is directed.

BRIEF DESCRIPTION OF THE FIGURES

An embodiment of the invention will now be described, by way of example only, and with reference to the figures, in which.

DESCRIPTION OF AN EMBODIMENT

Figure 1:
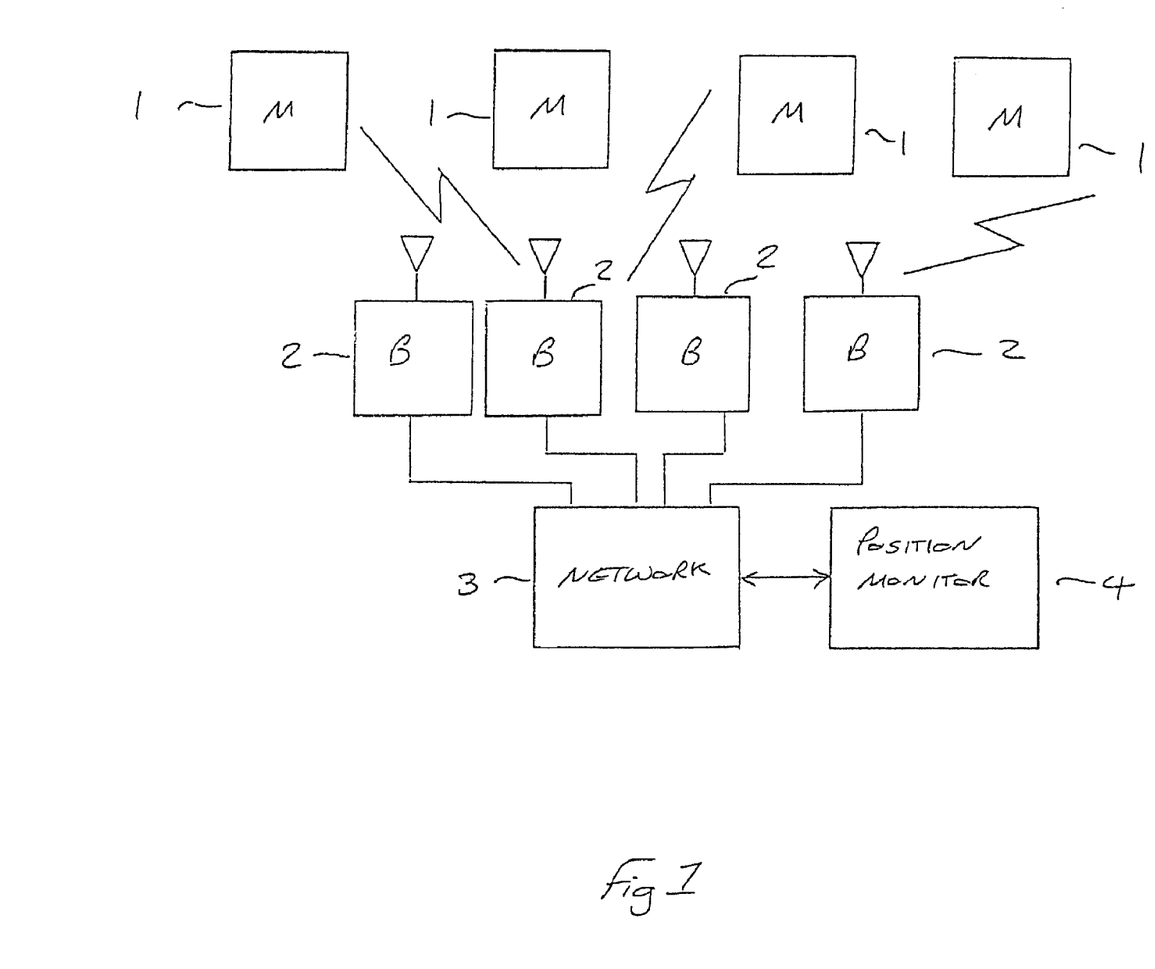
FIG. 1 shows a traffic monitoring system embodying the invention.

A vehicle traffic monitoring system is shown in FIG. 1. Individual hand held portable (HHP) mobile telephones 1 communicate with a mobile telephone network 3 through a plurality of base stations 2. The network 3 and base stations 2 could be for any type of mobile telephone technology protocol and frequency. Such as GSM 1900 MHz, 900 MHz or 1800 MHz or newer services such as UMTS. These and others are all within the scope of the invention. The embodiment also includes a position monitor 4 which analyses positions of mobile telephones and derives traffic information as a result. The functions provided by the position monitor are described later in detail.

The geolocation of each mobile telephone 1 communicating with the network 3 is derived either by the network 3 itself, by the position monitor 4 or a combination of the two. Appropriate methods of determining mobile telephone locations are known to the skilled person and include phased array antennas at each base station to derive the angle of the signal arriving from the mobile telephone. The angle is cross referenced with angles derived at other base stations to give a position. An alternative is to measure the time of arrival of a signal from the mobile telephone at a plurality of base stations, derive the relative distances and hence position. These two alternatives require little, if any, change to a mobile telephone to measure location, but would require some change to existing networks. There are many other ways of deriving position data, all of which will work with the proposed system. The software required to implement the system could be distributed around the network; this would allay any privacy fears as the only data that would be passed outside of a base station controller would be that a phone moved from here to here in this time, not that a particular user did so.

Figure 2:
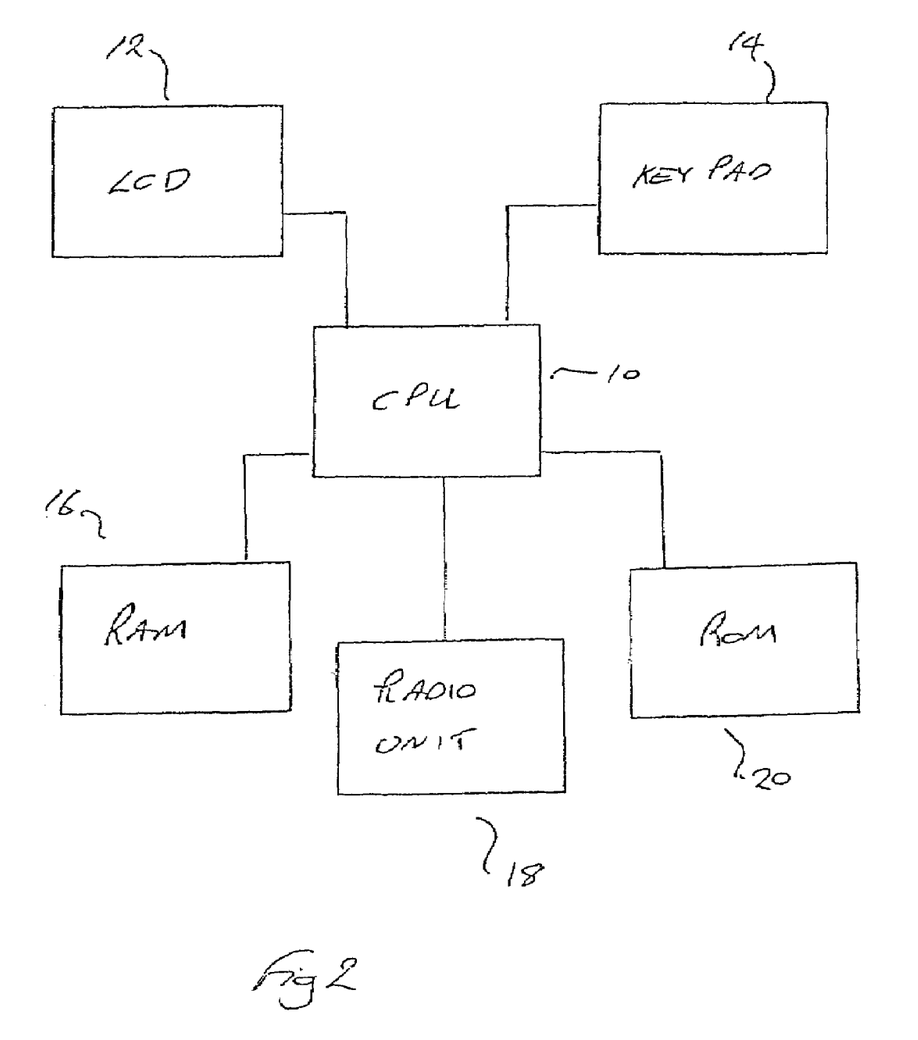
FIG. 2 shows the functional components of a mobile telephone.

A schematic view of the key functional parts of a mobile telephone is shown in FIG. 2. A CPU 10 provides the processing functions of the unit under control of software in ROM 20 and using store RAM 16. A display is provided here a LCD 12, and an input device, here a keypad 14. A radio unit 18 provides the RF transmit and receive functions and converts to and from speech data and RF signals. So far, these functional components are conventional and known to the skilled person.

Figure 3:
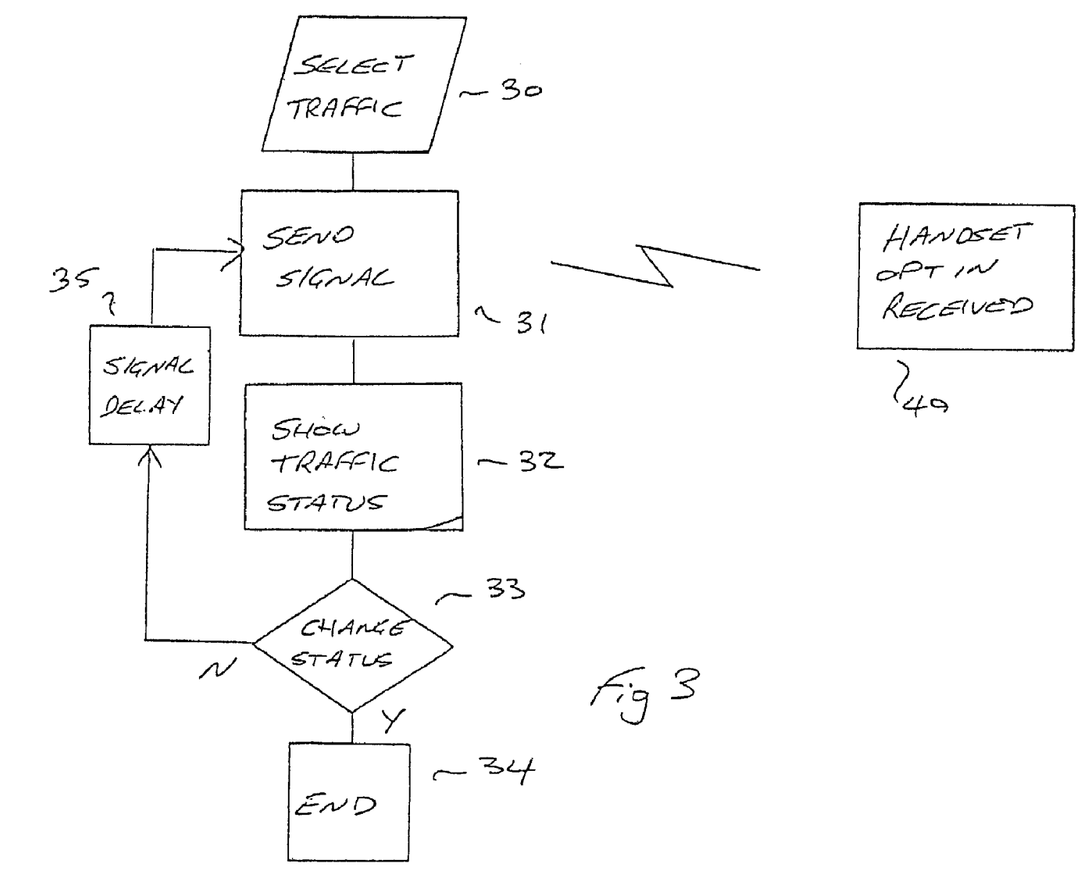
FIG. 3 shows the key functional steps in operating a mobile telephone according to the invention.

The processor 10, radio unit 18 and memory RAM 16/ROM 20 are configured to provide a function shown in FIG. 3. In a conventional HHP mobile telephone, the radio unit periodically broadcasts location updates, typically every 30 mins, or when moving between cells. However, this can be insufficient for traffic monitoring purposes, and this is addressed by the traffic update signal function of FIG. 3.

The traffic update signal function ensures that when a user requests traffic information, this fact is transmitted to the network and the user's HHP is reconfigured to transmit update messages more frequently than usual. The first step 30 is when the user selects the traffic information option. As a result a signal requesting this information is sent to the network and simultaneously provides an update on the HHP's position at step 31 using any of the geolocation methods previously described. The fact that the user has opted into the system is shown as step 32. If the user chooses to opt out of the system this is done at step 33 and the traffic update function ends at 34. The mobile telephone then returns to a normal state and broadcasts to the network in the normal manner.

While in the traffic monitor mode, a signal delay step 35 reduces the time between transmission of update signals so that the HHP sends update signals more frequently to the network. An alternative within the scope of the invention is not to change the handset, but change how the network regards the handset. The timing between location updates is likely to be entirely driven by the network; i.e. the network will ask "where are you?" rather than waiting to be told "I am here". This allows the network and traffic system to monitor the position and speed of the user more accurately, and also to know that the user is more likely to be travelling in a vehicle. This aids the analysis of position data as will now be described with reference to FIGS. 4 to 7.

Figure 4:
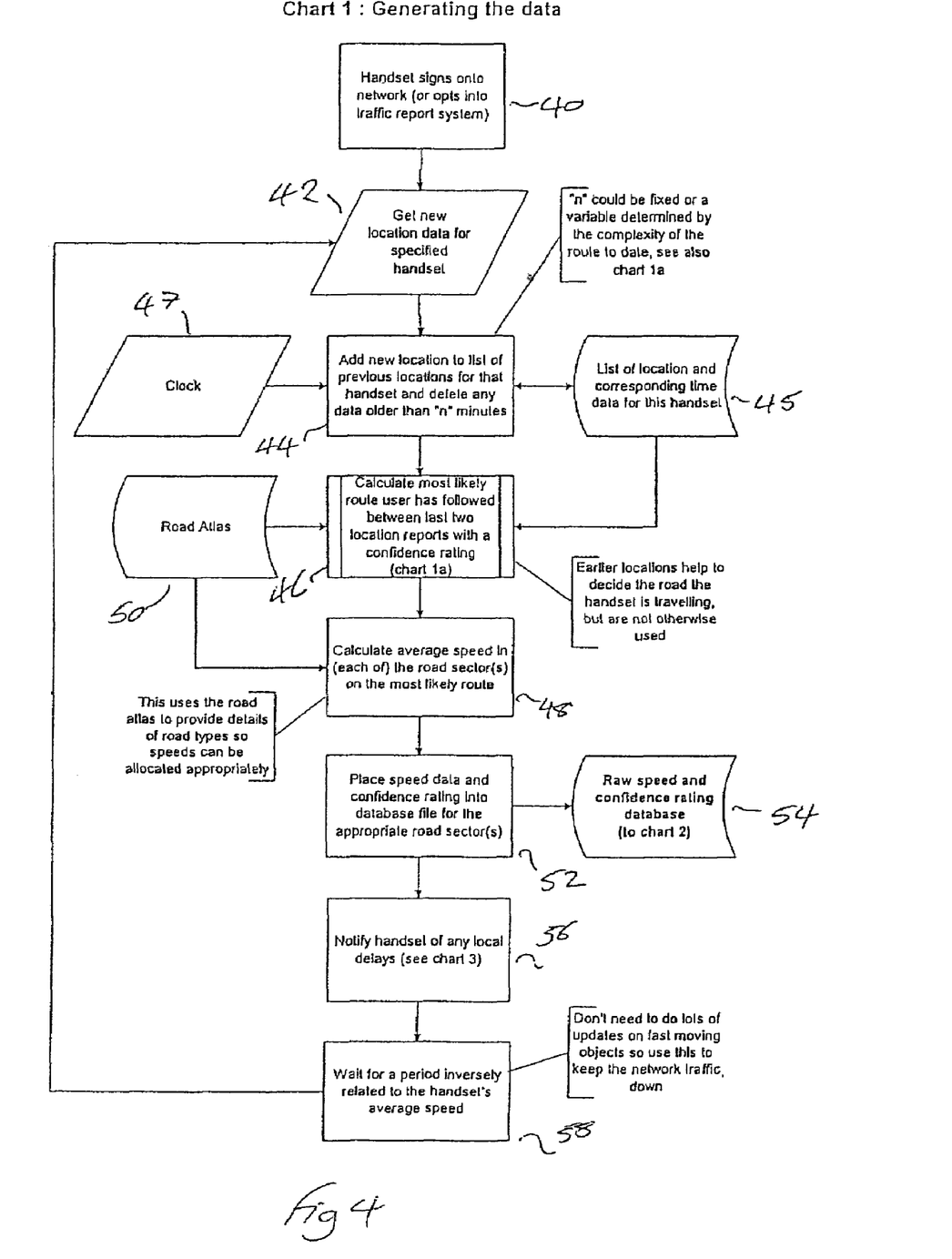
FIG. 4 is a flow chart of the main functions of a position monitoring unit embodying the invention.

FIG. 4 shows the overall processes (Chart 1) involved in traffic monitoring according to an embodiment of the invention. The first step 40 is when the handset signs onto the traffic monitor system (handset option received, FIG. 3). At Getnewlocation step 42, the location of the handset which has newly opted in is retrieved. The location is stored at addnewlocation step 44 in location/time database 45 and any "old" data is deleted governed by a clock 47. The storage of locations at given times allows a most likely route to be calculated at calculatemostlikely route step 46, further shown in Chart 1*a* of FIG. 5, described later. The average speed is then calculated at calculateaveragespeed step 48. The calculation of speed and location are both referenced to a stored road atlas 50. The speed data is allocated a confidence rating and is stored at speed data store step 52 into a speed database 54, further shown in Chart 2 of FIG. 6.

The steps so far are to allow derivation of traffic conditions. At the next step, the handset is notified of local traffic conditions at notifyhandset step 56, further shown in Chart 3 of FIG. 7. Lastly, a variable delay inversely related to a handset's speed is included at wait step 58 before retrieving new location data for the handset and reporting the process.

Figure 5:
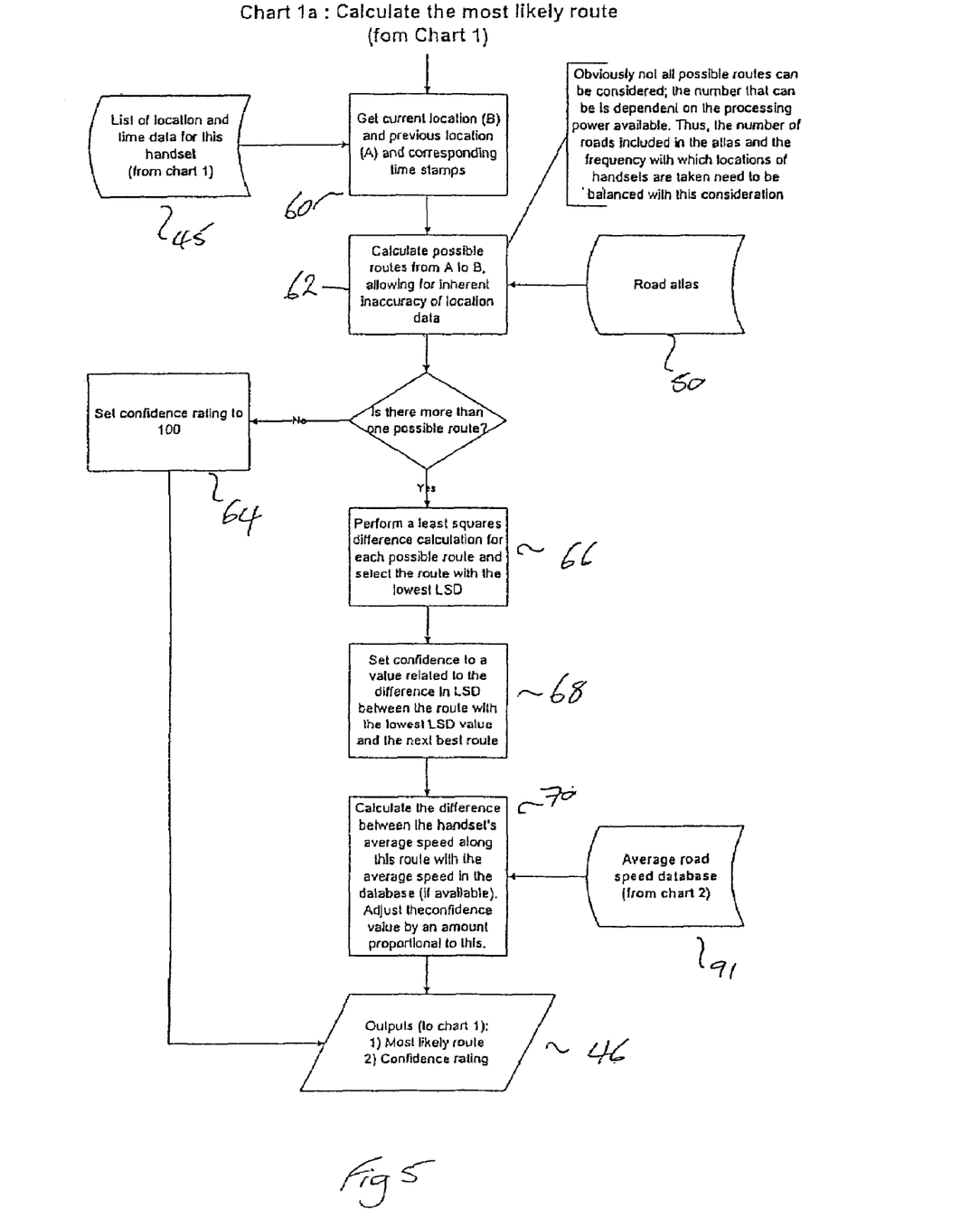
FIG. 5 is a flow chart of route calculation of FIG. 4 in greater detail.

The calculation of a most likely route for a given handset is shown in Chart 1*a* of FIG. 5. The list of location and time data for a given handset is retrieved from the location/time database 45, at getcurrentlocation step 60. The possible routes are then retrieved from the road atlas 50 at calculate routes step 62. If there is only one possible route, the confidence rating is set high (100) at step 64. If there are several routes, then at least squares difference calculation is performed at least squares step 66. The confidence valve is set as a function of the least squares calculation at step 68. The confidence valve is adjusted at calculatedifference step 70 to take into account the handset's average speed compared with others on the same route with reference to an average road speed database. The result is the most likely route and confidence rating presented at step 46, to Chart 1.

Figure 6:
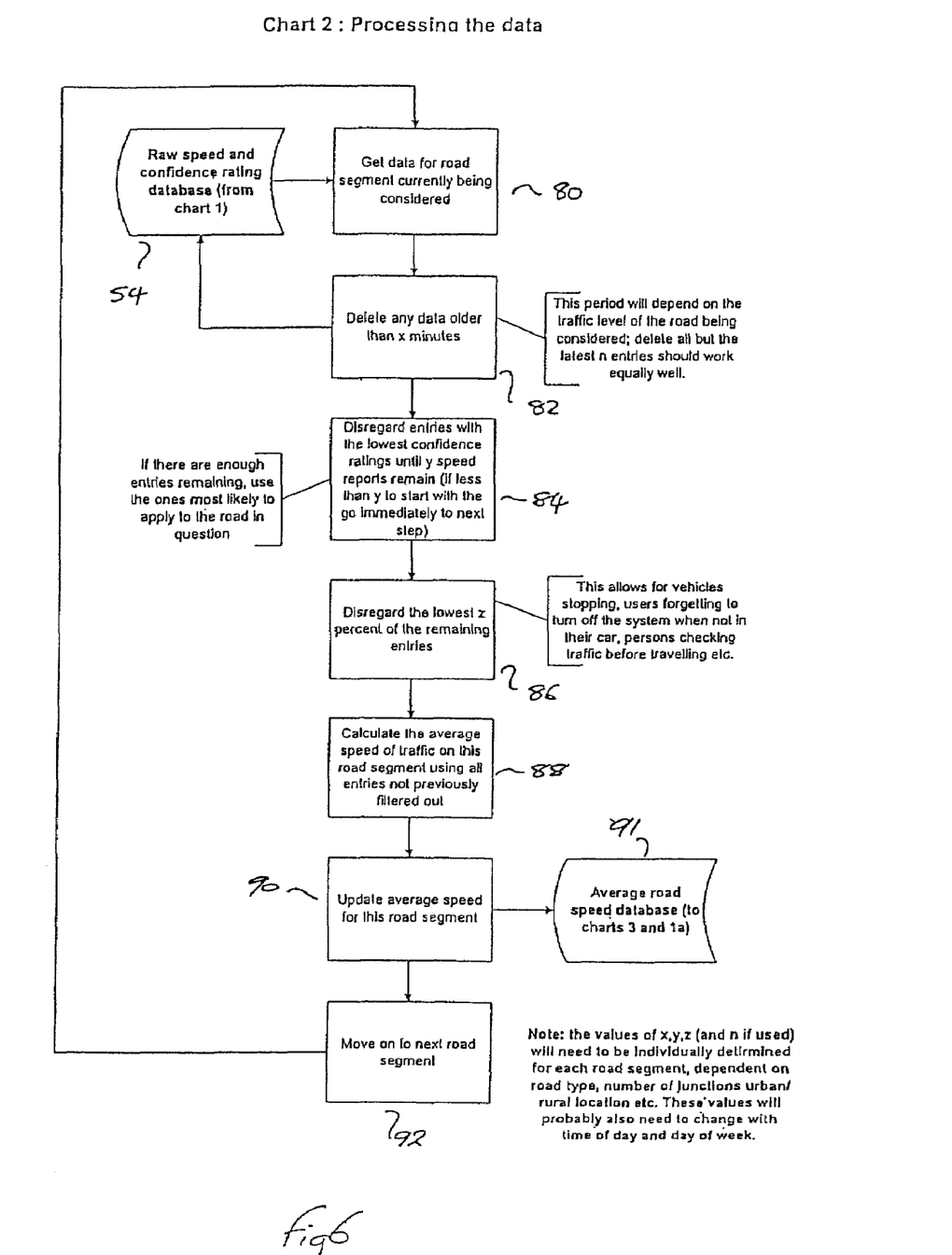
FIG. 6 is a flow chart of road speed calculation of FIG. 5 in greater detail.

To allow statistical analysis of the route data to provide traffic information, the route and confidence rating for each handset as well as the calculated speed of that handset is provided to a rawspeed and confidence rating database 54 for further analysis as shown in Chart 2 of FIG. 6. The raw speed and confidence database contains entries by time of speed and confidence data for each mobile telephone at given locations, and therefore road segment. To process this data, the data for a given road segment is first retrieved at getdata step 80. To ensure that the data relates to current traffic conditions, data older than a certain number of minutes is deleted at delete data step 82. To further increase the accuracy of the data a portion of the entries are disregarded at disregard entries step 84 to leave a given number or factor of entries remaining with higher confidence ratings. A still further step for increasing accuracy is undertaken at disregardlowest percent step 86 in which a given percentage of the lowest entries by speed are disregarded. This should remove users who are not in cars; this will be particularly relevant if the opt in method is by way of an account option rather than a handset setting. The remaining entries thereby relate to the more recent, higher confidence entries with speeds more likely to be near the median of speeds on the given road segment. The average road speed is thereby calculated at updateaveragespeed step 90 and provided to an average road speed database 91 which provides data for calculating confidence ratings in FIG. 5 (Chart 1*a*) and is used to provide information to users. Lastly, at step 92 the next road segment is retrieved on the calculation performed again.

Figure 7:
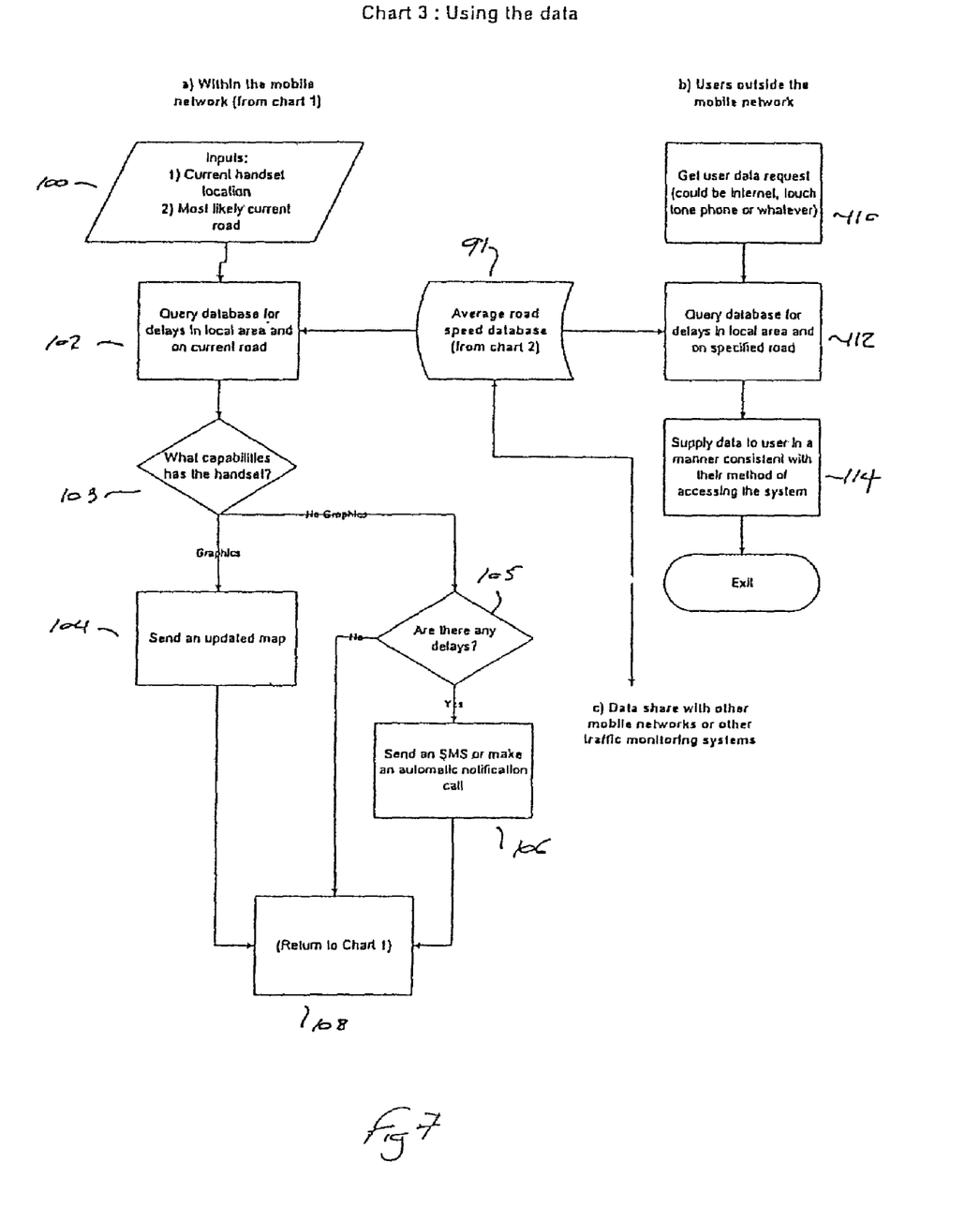
FIG. 7 is a flow chart of delay notification of FIG. 4 in greater detail.

The data derived can be provided to users in a variety of ways as shown in FIG. 7 (Chart 3). If the user requesting information is doing so from an HHP mobile, then that request is first used to reconfigure the HHP as previously described to send more frequent updates than usual, and to use the location information of that HHP in deriving traffic conditions as already described.

The position of the HHP and most likely current road is derived as previously described at inputs step 100. The average road speed database 91 is then queried at querydatabase step 102 and the capabilities of the handset are determined with reference to the type of signals received at step 103. If the handset can handle graphics, an updated map is sent at step 104 and, if not, an SMS notification is sent if there are delays at SMS step 106 or a short voice message describing the delays if the handset has an autoanswer capability.

The process then continues at the network/position monitor to continue monitoring of traffic conditions for as long as the user remains "opted-in" to the system.

If the requester is not a mobile telephone user on the network, e.g. on the Internet, then a getuserrequest step 110 retrieves data, supplies it at step 112 in the manner requested at step 114.

Whilst the system has been described as a separate network and position monitor, it will be appreciated that there are logical divisions and that the position monitor function could be performed by the network itself either at one location or distributed locations.

What is claimed is:

1. A vehicular traffic monitoring system for a mobile telephone network including a plurality of base stations for receiving and transmitting signals from and to a plurality of mobile telephones, the system comprising:
    a position monitoring unit for deriving the position of the plurality of mobile telephones communicating via the mobile telephone network, the position monitoring unit comprising a store for storing identification and position data for the plurality of mobile telephones; and
    a traffic flow analyser for determining traffic flow at positions of the plurality of mobile telephones,
    wherein the store and traffic flow analyser are configured such that the traffic flow is determined predominantly from the identification and position data of a subset of the plurality of mobile telephones, the subset being mobile telephones of users that have indicated a traffic monitor request to the mobile telephone network.

2. A system according to claim 1, wherein the subset of mobile telephones is those that have transmitted a traffic monitor request to the mobile telephone network.

3. A system according to claim 1 or 2, wherein the mobile telephones in the subset of mobile telephones are each arranged to broadcast a signal to the network more frequently than mobile telephones not in the subset.

4. A system according to claim 1, wherein the traffic flow analyser is configured to determine traffic flow by giving a greater weighting to position data of the subset of mobile telephones.

5. A system according to any of claim 1, wherein the traffic flow analyser is configured to determine a confidence rating for the route of each mobile telephone in the subset.

6. A system according to claim 5, wherein the traffic flow analyser is configured to determine traffic flow as a function of the data of the subset with a higher confidence rating.

7. A system according to claim 1, wherein the position monitor is configured to determine traffic flow as a function of the data of the subset with higher speeds.

8. A method for monitoring vehicular traffic in a mobile telephone network, the method comprising:
- deriving a position of a plurality of mobile telephones communicating via the mobile telephone network;
- storing identification and position data for each of the plurality of mobile telephones; and
- determining traffic flow at positions of the plurality of mobile telephones,
- wherein the determining of traffic flow is determined predominantly from the identification and position data of a subset of the plurality of mobile telephones, the subset being those mobile telephones of users that have indicated a traffic monitor request to the mobile telephone network.

9. A method according to claim 8, wherein the subset of mobile telephones is those that have transmitted a traffic monitor request to the mobile telephone network.

10. A method according to claim 8 or 9, wherein the step of determining a traffic flow is achieved by giving a greater weighting to position data of the subset of mobile telephones.

11. A method according to claim 8, wherein the step of determining traffic flow comprises a function placed on a confidence rating of the route of each mobile telephone in the subset.

12. A method according to claim 8, wherein the step of determining traffic flow is a function of the data of the subset with a higher confidence rating.

13. A method according to claim 8, wherein the step of determining traffic flow is a function of the data of the subset with higher speeds.

* * * * *